(12) United States Patent
Brown et al.

(10) Patent No.: US 7,575,194 B2
(45) Date of Patent: Aug. 18, 2009

(54) APPARATUSES AND METHODS FOR JOINING COMPOSITE MEMBERS AND OTHER STRUCTURAL MEMBERS IN AIRCRAFT WING BOXES AND OTHER STRUCTURES

(75) Inventors: Stephen T. Brown, Everett, WA (US); Max U. Kismarton, Renton, WA (US)

(73) Assignee: The Boeing Company, Chicago, IL (US)

(*) Notice: Subject to any disclaimer, the term of this patent is extended or adjusted under 35 U.S.C. 154(b) by 173 days.

(21) Appl. No.: 11/607,333

(22) Filed: Nov. 30, 2006

(65) Prior Publication Data

US 2008/0128553 A1 Jun. 5, 2008

(51) Int. Cl.
*B64C 3/18* (2006.01)
*B64C 1/06* (2006.01)
(52) U.S. Cl. .................................. 244/123.1; 244/131
(58) Field of Classification Search .................. 244/120, 244/123.1, 123.13, 123.5, 123.6, 123.7, 123.8, 244/123.9, 131, 133, 119, 124; 403/187, 403/230, 188, 262; 52/272, 282.1
See application file for complete search history.

(56) References Cited

U.S. PATENT DOCUMENTS 2,948,940 A * 8/1960 Degener ..................... 403/188
4,256,790 A * 3/1981 Lackman et al. .............. 428/73
6,945,727 B2 9/2005 Christman et al.
2004/0011927 A1* 1/2004 Christman et al. .......... 244/131

OTHER PUBLICATIONS

U.S. Appl. No. 11/154,522, Westre et al.

* cited by examiner

*Primary Examiner*—Michael R Mansen
*Assistant Examiner*—Stephen Brookman
(74) *Attorney, Agent, or Firm*—Perkins Coie LLP (57) ABSTRACT

Apparatuses and methods for joining composite members and other structural members in aircraft wings and other structures. An aircraft wing box structure configured in accordance with one embodiment of the invention includes a first composite member having a first surface portion positioned at an angel relative to a second surface portion of a second composite member. The wing box structure of this embodiment further includes at least one metallic joining member having an upstanding leg portion extending from a base portion. The base portion of the joining member is bonded to the first surface portion of the first composite member with a first portion of adhesive, and the upstanding leg portion of the metallic joining member is bonded to the second surface portion of the second composite member with a second portion of adhesive.

8 Claims, 4 Drawing Sheets

APPARATUSES AND METHODS FOR JOINING COMPOSITE MEMBERS AND OTHER STRUCTURAL MEMBERS IN AIRCRAFT WING BOXES AND OTHER STRUCTURES

TECHNICAL FIELD

The following disclosure relates generally to aircraft structures and, more particularly, to apparatuses and methods for joining composite members and other structural members in aircraft wings and other structures.

BACKGROUND

Fiber-reinforced resin materials, or "composite" materials as they are commonly known, have relatively high strength-to-weight ratios, good corrosion resistance, and other beneficial properties that make them particularly well suited for use in aerospace applications. Conventional composite materials typically include glass, carbon, or polyaramid fibers in woven and non-woven configurations. In the raw material stage, the fibers can be formed into tapes, filaments, and fabric sheets that are pre-impregnated with uncured resin. The raw materials can be manufactured into parts by laminating them onto a mold surface, and then applying heat and pressure to cure the resin and harden the laminate. Composite sandwich structures can be manufactured by laminating a core material (e.g., a foam or honeycomb material) between two facesheets composed of laminated plies, tapes, and/or filaments. Facesheets can also include one or more metallic layers.

Because of their relatively high strength-to-weight ratios, composite materials are often used in aircraft structures to reduce weight and increase performance. In fighter aircraft, business jets, and other relatively high-performance aircraft, for example, composite materials have been used in both primary and secondary structures. In large commercial aircraft, however, the use of composite materials has traditionally been limited to non-critical, secondary structures, while wing spars and other primary structures have been manufactured predominantly from metals such as aluminum, titanium, etc.

When used in primary structure, composite wing spars are typically manufactured by forming a solid laminate of fiber plies having a "C" cross-sectional shape. This relatively simple method reduces part count and lends itself well to automated lay-up procedures. One downside of this approach, however, is that it can be difficult to vary the ply count over the length and height of the spar. As a result, some portions of the spar may be much thicker (and heavier) than they need to be to meet localized structural requirements. In addition, composite spars manufactured in this way often have to be reinforced with stiffeners which are bolted or bonded to the spar web between ribs to limit buckling. Moreover, such spars often do not meet ground plane and electromagnetic effects (EME) requirements without the addition of relatively heavy ground cables to the upper and lower portions of the spar.

SUMMARY

The following summary is provided for the benefit of the reader only, and is not intended to limit the invention as set forth by the claims in any way.

The present invention is directed generally toward apparatuses and methods for joining structural members in aircraft wing boxes and other structures. An aircraft structure configured in accordance with one aspect of the invention includes first and second structural members. The first structural member is constructed of composite materials and has a first surface portion and a second surface portion forming a tapered edge portion. The tapered edge portion at least approximately abuts a third surface portion of the second structural member. The aircraft structure further includes first and second metallic joining members. The first metallic joining member has a first base portion positioned adjacent to the third surface portion of the second structural member, and a first upstanding leg portion positioned adjacent to the first surface portion of the first structural member. The second metallic joining member has a second base portion positioned adjacent to the third surface portion of the second structural member, and a second upstanding leg portion positioned adjacent to the second surface portion of the first structural member. In addition to the foregoing elements, the aircraft structure additionally includes first and second portions of adhesive. The first portion of adhesive forms a first structural bond between the first upstanding leg portion of the first metallic joining member and the first surface portion of the first structural member. The second portion of adhesive forms a second structural bond between the second upstanding leg portion of the second metallic joining member and the second surface portion of the first structural member.

An aircraft wing structure configured in accordance with another aspect of the invention includes a plurality of wing ribs extending between a front wing spar and a rear wing spar. The front wing spar has a front spar web, the rear wing spar has a rear spar web, and each wing rib has a corresponding rib web constructed from composite materials. Each rib web is fixedly attached to the front and rear spar webs by a first metallic joining member and a second metallic joining member. More specifically, the first metallic joining member has a first surface portion structurally bonded to the front spar web and a second surface portion structurally bonded to the rib web. Similarly, the second metallic joining member has a third surface portion bonded to the rear spar web and a fourth surface portion structurally bonded to the rib web.

DETAILED DESCRIPTION

The following disclosure describes apparatuses and methods for joining composite members and other structural members in aircraft wing boxes and other structures. Certain details are set forth in the following description and in FIGS. 1-9 to provide a thorough understanding of various embodiments of the invention. Other details describing well-known methods, structures and systems often associated with the manufacture and assembly of composite parts and aircraft structures are not set forth in the following disclosure to avoid unnecessarily obscuring the description of the various embodiments of the invention.

Many of the details, dimensions, angles and other features shown in the Figures are merely illustrative of particular embodiments of the invention. Accordingly, other embodiments can have other details, dimensions, angles and features without departing from the spirit or scope of the present invention. In addition, further embodiments of the invention can be practiced without several of the details described below.

In the Figures, identical reference numbers identify identical, or at least generally similar, elements. To facilitate the discussion of any particular element, the most significant digit or digits of any reference number refer to the Figure in which that element is first introduced. For example, element 110 is first introduced and discussed with reference to FIG. 1.

Figure 1:
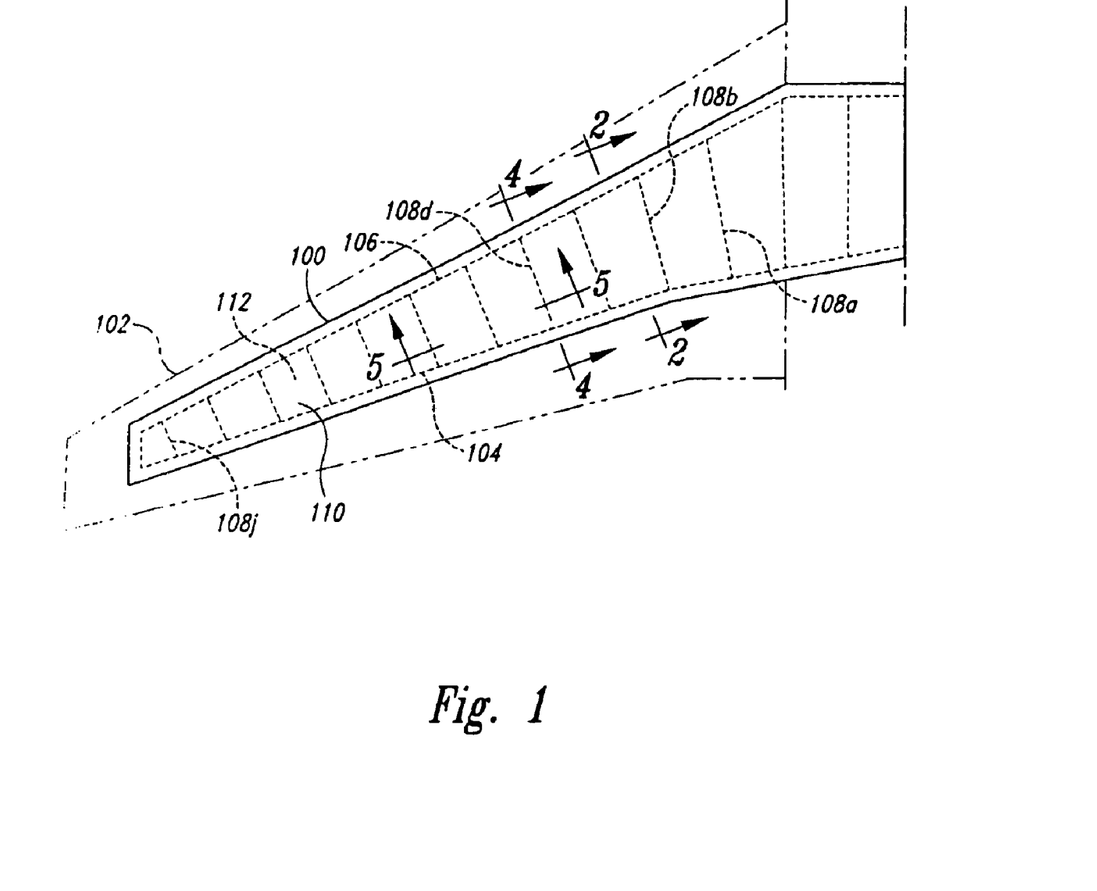
FIG. 1 is a partially hidden plan view of a wing box structure configured in accordance with an embodiment of the invention.

FIG. 1 is a partially hidden top view of an aircraft wing 102 having a wing box 100 configured in accordance with an embodiment of the invention. The wing box 100 includes a series of wing ribs 108 (identified individually as ribs 108a-j) extending between a front wing spar 106 and a rear wing spar 104. An upper skin panel 110 and a lower skin panel 112 are attached to the front spar 106, the rear spar 104, and the wing ribs 108 to form an enclosed box structure.

The wing box 100 is the primary load carrying structure of the wing 102. In this regard, the wing box 100 can carry a number of important aircraft systems including, for example, fuel tanks, engine supports, control surface actuation systems, landing gears, etc. As described in greater detail below, in this embodiment the front spar 106, the rear spar 104, the upper skin panel 110, and the lower skin panel 112 can be individually manufactured from composite materials and joined together with metallic joining members that are bonded to the individual composite parts to form the wing box 100. In other embodiments, however, the front spar 106, the rear spar 104, the upper skin panel 110, and/or the lower skin panel 112 can be manufactured, or at least partially manufactured, from metals, such as aluminum, titanium, and/or steel. For example, in various embodiments of the invention, the front spar 106 and/or the rear spar 104 can be manufactured from metal using conventional techniques known in the art. In yet other embodiments, one or more of the structural members identified above can be manufactured from composite materials but can also include one or more metallic facesheets or other elements. For example, in various embodiments the front spar 106 and/or the rear spar 104 can include composite sandwich structures with one or more metallic facesheets for additional strength and/or other reasons.

Figure 2:
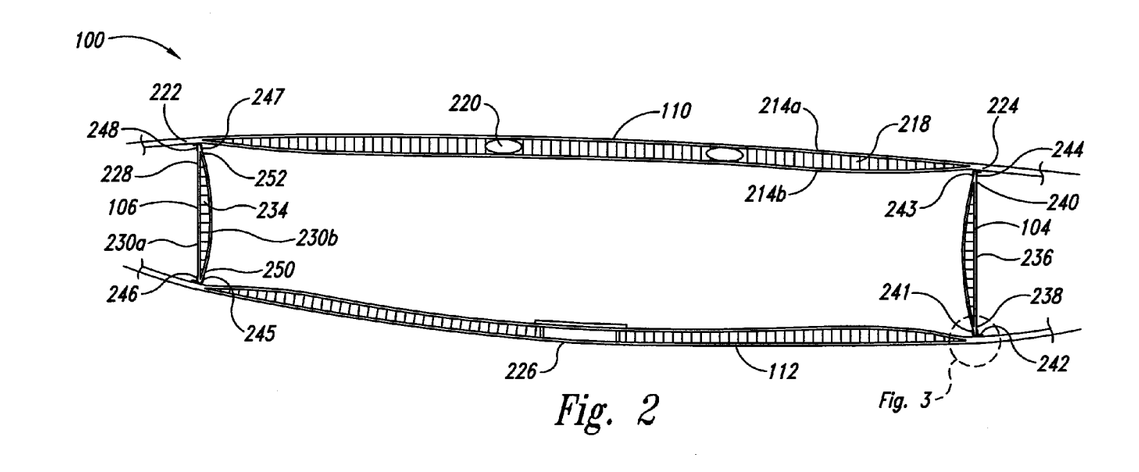
FIG. 2 is an enlarged cross-sectional view of the wing box structure of FIG. 1, taken substantially along line 2-2 in FIG. 1.

FIG. 2 is an enlarged cross-sectional view of the wing box 100 taken substantially along line 2-2 in FIG. 1. In one aspect of this embodiment, the upper skin panel 110 can include a core 218 sandwiched between a first facesheet 214a and a second facesheet 214b. The facesheets 214 can be constructed from lay-ups of fiber-reinforced resin materials. Such materials can include, for example, graphite-reinforced epoxy materials in fabric, tape, tow, filament and/or other suitable forms, as well as other suitable fiber-reinforced resin materials. In other embodiments, the facesheets can include metallic materials, such as aluminum, titanium, and/or steel in skin, panel, and/or other forms. The core 218 can include various types of honeycomb materials, such as NOMEX® aramid fiber honeycomb, aluminum honeycomb, and graphite/epoxy, as well as various types of open or closed cell foam and/or other suitable core materials.

In one embodiment, the upper skin panel 110 can be constructed by using an automated lay-up process to arrange a plurality of fabric and/or tape plies against a tool surface (not shown) to form the first facesheet 214a. A first layer of adhesive can then be applied to the first facesheet 214a, and the core 218 can be positioned on the first layer of adhesive. A second layer of adhesive can then be applied to the surface of the core 218, and a similar automated lay-up process can be used to overlay the core 218 with additional fabric and/or tape plies to form the second facesheet 214b. The thickness of the core 218 can taper down toward the front spar 106 and the rear spar 104 so that the face sheets 214 can form a solid laminate in these areas. This assembly can then be vacuum-bagged and positioned in an evacuated and/or elevated-temperature environment (e.g., an autoclave) for curing. In other embodiments, the upper skin panel 110 can be manufactured by other composite manufacturing methods known in the art.

In another aspect of this embodiment, the upper skin panel 110 can include one or more conduits 220 through which electrical wiring, hydraulic lines and/or other wing systems can pass. The lower skin panel 112 can be at least generally similar in structure as the upper skin panel 110. In the illustrated embodiment, however, the lower skin panel 112 can include a removable panel 226 to provide access to the interior of the wing box 100 for maintenance, inspection, etc.

The front spar 106 includes a front spar web 228 that extends between a lower edge portion 250 and an upper edge portion 252. The front spar web 228 can be at least generally similar in construction as the upper skin panel 110 described above. In this regard, the front spar web 228 can include a core 234 sandwiched between a first facesheet 230a and a second facesheet 230b. In this embodiment, the face sheets 230 are bonded, laminated, or otherwise joined together along the upper and lower edges of the front spar web 228 so that both the lower edge portion 250 and the upper edge portion 252 are tapered as shown in FIG. 2. The facesheets 230 can include various types of composite materials, such as graphite/epoxy fabric and tape materials. In addition, the facesheets 230 can also include various types of metallic materials. The metallic materials can be used in conjunction with the composite materials (e.g., bonded to the composite facesheets) or used in place of composite facesheets. The core 234 can include suitable types of honeycomb, foam, and other known materials. In one aspect of this embodiment, the front spar web 228 can be manufactured using an automated, flat lay-up process. This process can reduce manufacturing costs because the first facesheet 230a is laid-up against a relatively flat tool surface, rather than a curved tool surface. The rear spar 104 includes a rear spar web 236 extending between a lower edge portion 238 and an upper edge portion 240. The rear spar 104 can be at least generally similar in construction as the front spar 106.

Although the front spar 106 and the rear spar 104 can include composite sandwich structures as described above, the present invention is not limited to this particular embodiment. Indeed, in other embodiments, the front spar 106 and/or the rear spar 104 can be machined, built-up, and/or otherwise fabricated from metallic materials using conventional spar manufacturing methods known in the art. In such embodiments, the front spar web 228 and the rear spar web 236 could be formed from solid metal sheets, panels, and/or other forms.

The wing box 100 can also include a plurality of metallic joining members that are adhesively bonded to the front spar 106, the rear spar 104, the upper skin panel 110 and the lower skin panel 112 to structurally attach the composite members together. For example, the lower edge portion 238 of the rear spar web 236 can be fixedly attached to the lower skin panel 112 with a first spar joining member 241 and a second spar joining member 242. Similarly, the upper edged portion 240 of the rear spar web 238 can be fixedly attached to the upper skin panel 110 by a third spar joining member 243 and a fourth spar joining member 244. Moving to the front spar 106, the lower edge portion 250 of the front spar web 228 can be fixedly attached to the lower skin panel 112 by a fifth spar joining member 245 and a sixth spar joining member 246. Similarly, the upper edge portion 252 of the front spar web 228 can be fixedly attached to the upper skin panel 110 by a seventh spar joining member 247 and an eighth spar joining member 248. Each of these structural joints is described in more detail below.

Figure 3:
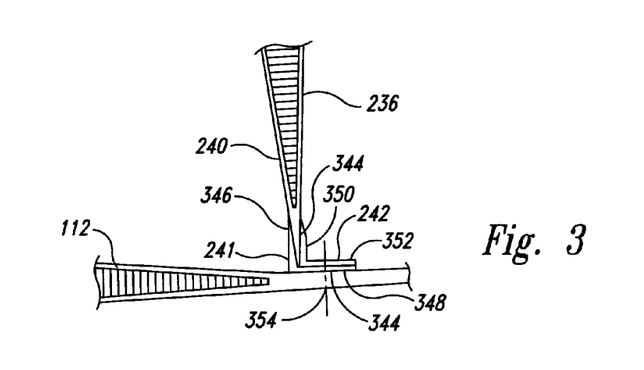
FIG. 3 is an enlarged cross-sectional view of a portion of the wing box structure illustrated in FIG. 2.

FIG. 3 is an enlarged cross-sectional view illustrating the joint where the rear spar web 236 at least approximately abuts the lower skin panel 112. The first joining member 241 includes a first upstanding leg portion 346 and a first base portion 348. The second joining member 242 includes a second upstanding leg portion 350 and a second base portion 352. In this embodiment, the lower edge portion 240 of the rear spar web 236 is sandwiched between the first upstanding leg portion 346 and the second upstanding leg portion 350, and the first base portion 348 is sandwiched between the second base portion 352 and the lower skin panel 112. Adhesive 344 can be applied to the mating surfaces of the rear spar web 236, the first joining member 241, the second joining member 242, and the lower skin panel 112 to bond the parts together. At least the distal end portions of the first upstanding leg portion 346 and/or the second upstanding leg portion 350 can be tapered as shown in FIG. 3 for efficient load transfer between the joining members and the rear spar web 236. Tapering in this manner can also reduce peak loads at the distal ends of the upstanding leg portions. In some embodiments, one or more fasteners 354 can be installed through the first base portion 348, the second base portion 352, and the lower skin panel 112 (in addition to, or in place of, the adhesive 344) to structurally attach the first joining member 241 and the second joining member 242 to the lower skin panel 112. Various types of fasteners can be used for this purpose including, for example, bolts, lock-pins, rivets, etc.

The joining members 241 and 242 can be made from various types of metallic materials including, for example, aluminum, titanium, stainless steel, etc. In one embodiment, the joining members 241 and 242 can be bonded to the rear spar web 236 and/or the lower skin panel 112 with "bond on demand" technology. With "bond on demand" technology, the adhesive is applied to the bonding surfaces, but the adhesive does not cure or harden until it is activated within the bond line with radiation energy (e.g., X-Ray, electron beam, Ultraviolet and/or other light energy, etc.). This technique allows the parts to be adjusted during final assembly, and it avoids putting detrimental heat into the parts during the adhesive cure cycle. This method also allows bonding of large assemblies that might otherwise not be able to fit into an autoclave or oven for curing. Types of adhesives that can be used for this purpose include acrylate or epoxy adhesives, such as AP299, etc. In other embodiments, other adhesives (e.g., other thermally cured adhesives) can be used to bond the rear spar web 236 to the lower skin panel 112. Such adhesives can include, for example, epoxy adhesives (e.g., HYSOL® EA9696epoxy adhesive, HYSOL® EA9380epoxy adhesive, etc.) and other suitable adhesives known in the art for structurally joining metallic materials to composite materials. In some embodiments, the bonding methods and/or systems disclosed in U.S. patent application Ser. No. 11/154,522, filed Jun. 6, 2005, and entitled "Composite Reinforcement of Metallic Structural Elements," can be used to bond two or more of the structural parts described herein together. U.S. patent application Ser. No. 11/154,522 is incorporated herein in its entirety by reference.

Figure 4:
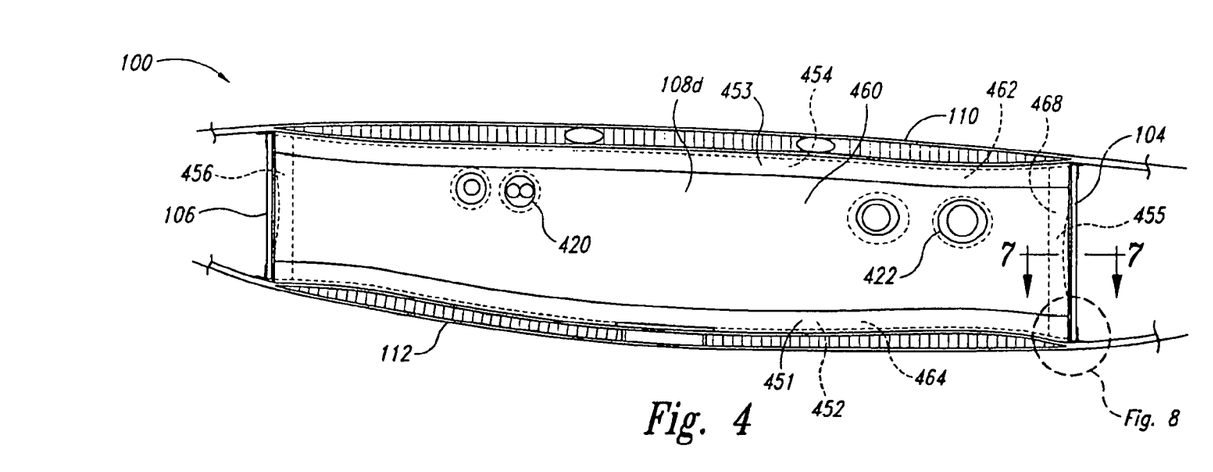
FIG. 4 is an enlarged cross-sectional view of the wing box structure of FIG. 1, taken substantially along line 4-4 in FIG. 1.
Figure 5:
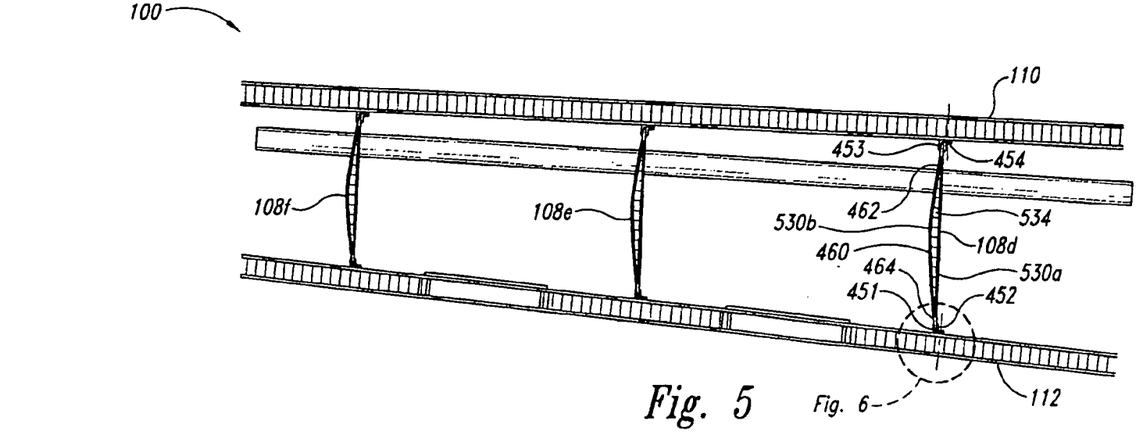
FIG. 5 is an enlarged cross-sectional view of the wing box structure of FIG. 1, taken substantially along line 5-5 in FIG. 1.

FIG. 4 is an enlarged cross-sectional view of the wing box 100 taken substantially along line 4-4 in FIG. 1, and FIG. 5 is an enlarged cross-sectional view of the wing box 100 taken substantially along line 5-5 in FIG. 1. These Figures illustrate a portion of the wing box 100 that includes the wing rib 108d. Referring to FIGS. 4 and 5 together, the wing rib 108d can include a rib web 460 that is generally similar in construction as the front spar web 228 described above with reference to FIG. 2. More specifically, the rib web 460 can include a core 534 sandwiched between a first facesheet 530a and a second facesheet 530b. The facesheets 530 can include various types of composite materials, such as graphite/epoxy fabric and tape materials. The core 534 can include suitable types of honeycomb, foam, and other known materials. In one aspect of this embodiment, the rib web 460 can be manufactured using an automated, flat lay-up process. In other embodiments, the rib web 460 can have other structural configurations and can be manufactured with other suitable methods known in the art. For example, in one other embodiment, the rib web 460 can be a solid laminate of composite material.

The rib web 460 can carry a conduit 420 for passage of various wing systems (e.g. electrical systems, hydraulics systems, etc.). The rib web 460 can also include one or more holes 422 for passage of air (or fuel if the wing rib 108 is positioned in a wing fuel tank). The rib web 460 includes an upper edge portion 462, a lower edge portion 464, a forward edge portion 466, and an aft edge portion 468. As described in greater detail below with reference to FIGS. 5-8, the lower edge portion 464 can be attached to the lower skin panel 112 with a first rib joining member 451 and a second rib joining member 452. Similarly, the upper edge portion 462 can be attached to the upper skin panel 110 with a third rib joining member 453 and a fourth rib joining member 454. In addition, the rear edge portion 468 can be attached to the rear spar web 104 with a fifth rib joining member 455, and the forward edge portion 466 can be attached to the front spar web 106 with a sixth rib joining member 456.

Figure 6:
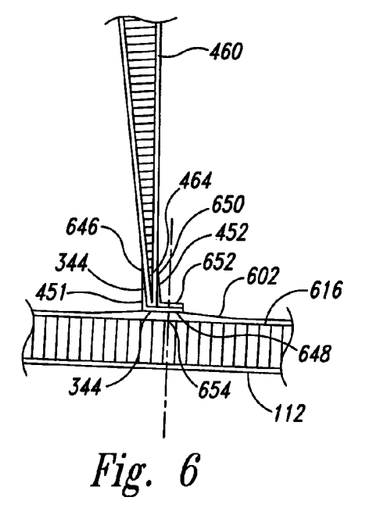
FIG. 6 is an enlarged cross-sectional view of a portion of the wing box structure illustrated in FIG. 5.

FIG. 6 is taken from FIG. 5, and is an enlarged cross-sectional view illustrating the joint between the rib web 460 and the lower skin panel 112 in more detail. As this view illustrates, the first rib joining member 451 can include a first upstanding leg portion 646 and a first base portion 648. The second rib joining member 452 can include a second upstanding leg portion 650 and a second base portion 652. In this embodiment, the lower edge portion 464 of the rib web 460 is sandwiched between the first upstanding leg portion 646 and the second upstanding leg portion 650, and the first base portion 648 is sandwiched between the second base portion 652 and the lower skin panel 112. The adhesive 344 can be applied to the mating surfaces of the rib web 460, the first upstanding leg portion 646, and the second upstanding leg portion 650 to bond the rib web 460 to the joining members (using, e.g., bond on demand technology as described above, or another suitable method known in the art). The adhesive 344 can also be used to bond the first base portion 648 to the second base portion 652 and to an inner facesheet 616 of the lower skin panel 112. In addition or alternatively, one or more fasteners 654 can also be used to structurally attach the first rib joining member 451 and the second rib joining member 452 to the lower skin panel 112. As FIG. 6 illustrates, the inner facesheet 616 of the lower skin panel 112 can include additional composite material in a built-up area 602 adjacent to the rib web 460 to efficiently transfer loads from the rib web 460 into the lower skin panel 112.

Figure 7:
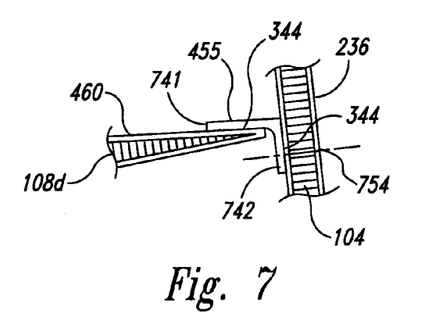
FIG. 7 is an enlarged cross-sectional view of a portion of the wing box structure illustrated in FIG. 4.

FIG. 7 is an enlarged cross-sectional view taken along line 7-7 in FIG. 4, and illustrates the joint where the wing rib 108d at least approximately abuts the rear spar 104. The fifth rib joining member 455 can include an upstanding leg portion 741 and a base portion 742. The upstanding leg portion 741 can be bonded to the rib web 460 with the adhesive 344. Similarly, the base portion 742 can be bonded to the rear spar web 236 with the adhesive 344. In addition or alternatively, one or more fasteners 754 can be used to structurally attach the fifth joining member 455 to the rear spar web 236.

In the embodiment illustrated in FIG. 7, only a single joining member, i.e., the fifth rib joining member 455, is used to attach the rib web 460 to the rear spar web 236. In other embodiments, however, two or more joining members can be used for this purpose. For example, in another embodiment, two joining members in the configuration illustrated in FIG. 3 can be used to attach the rib web 460 to the rear spar web 236.

Figures 8, 9:
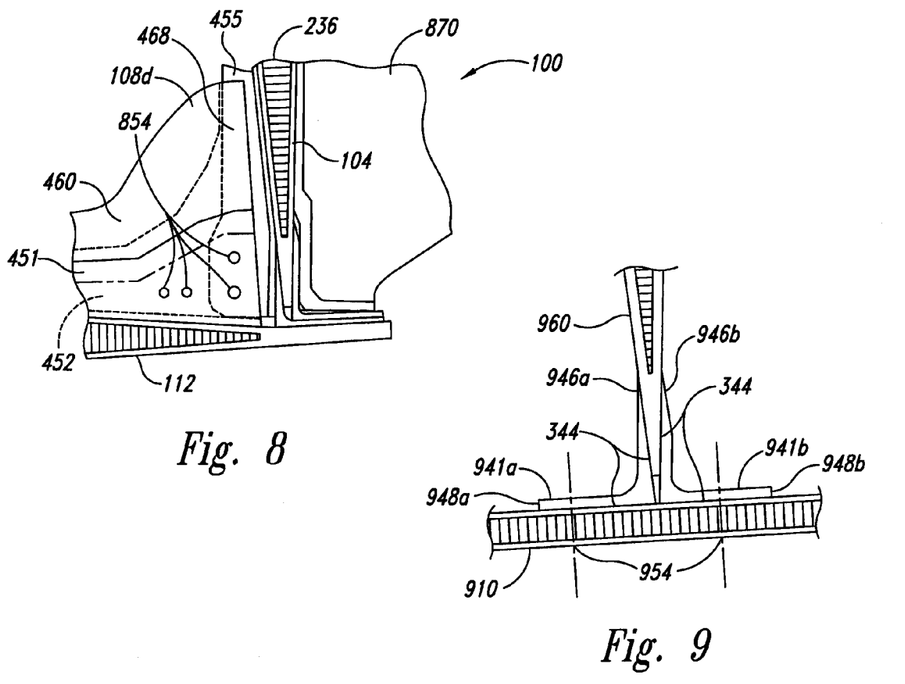
FIG. 8 is an enlarged cross-sectional view of another portion of the wing box structure illustrated in FIG. 4.
FIG. 9 is an enlarged cross-sectional view of a wing box structure joint configured in accordance with another embodiment of the invention.

FIG. 8 is taken from FIG. 4, and is an enlarged cross-sectional view illustrating the joint between the wing rib 108d, the rear spar 104, and the lower skin panel 112 in more detail. As this view illustrates, one or more structural fasteners 854 (e.g., bolts, lock pins, rivets, etc.) can be used to attach the end portion of the first rib joining member 451 to the end portion of the second rib joining member 452 and/or the adjacent end portion of the fifth rib joining member 455. Such fasteners may be required or advantageous in other areas where the rib joining members transfer relatively high loads, as may be the case where a fitting 870 (e.g., a control surface hinge or gear fitting) is attached to the backside of the rear spar 104 adjacent to the wing rib 108d.

FIG. 9 is an enlarged cross-sectional view illustrating a structural joint (e.g., a composite rib/spar joint) configured in accordance with another embodiment of the invention. Here, a first composite member 960 (e.g., a composite rib web, spar web, etc.) is bonded to a second composite member 910 (e.g., a wing skin panel, fuselage skin panel, control surface panel, etc.) by a first joining member 941a and a second joining member 941b. Each of the joining members 941 includes an upstanding leg portion 946 (identified individually as a first upstanding leg portion 946a and a second upstanding leg portion 946b) which extends from a corresponding base portion 948 (identified individually as a first base portion 948a and a second base portion 948b). The first and second joining members 941 are positioned back-to-back so that the corresponding base portions 948 extend outwardly to form a "T." The first composite member 960 can be bonded to the upstanding leg portions 946 with the adhesive 344. The base portions 948 can also be bonded to the second composite member 910 with the adhesive 344. In addition or alternatively, a plurality of fasteners 954 can be used to structurally attach the joining members 941 to the second composite member 910.

Although various joining member configurations have been described above for purposes of illustration, other joining member configurations can be used to bond wing box members and other structures together as disclosed herein. Such configurations can include, for example, one-piece joining members which have a groove to receive an edge portion of at least one composite member. These one-piece joining members can have "L" shapes resembling the combined two-piece arrangement of FIG. 3, or a "T" shapes resembling the two-piece configuration of FIG. 9. In other embodiments, still further joining member configurations can be used to assemble composite wing boxes and other structures without departing from the present disclosure.

There are a number of advantages associated with various embodiments of the invention described above. One advantage of bonding composite ribs, spars, and/or skin panels together is that it spreads the load over a larger area, providing a uniform load distribution across the joint without the peak loads associated with bolted joints. This method also seals the joint eliminating or reducing leak paths. Furthermore, the use of dissimilar materials (i.e., composites and metals) allows optimization of structural functions. For example, metal flanges can be sized for out-of-plane loads, while composite webs can be sized for shear transfer. In addition, the "flat" composite webs described herein can be manufactured by automated lay-up processes, which can improve quality and reduce manufacturing costs as compared to spar and web members which are hand-formed into solid laminates with "C" cross-sectional shapes.

From the foregoing, it will be appreciated that specific embodiments of the invention have been described herein for purposes of illustration, but that various modifications may be made without deviating from the spirit and scope of the various embodiments of the invention. For example, although aspects of the invention have been described above in the context of an aircraft wing, in other embodiments, the structural methods and apparatuses described above can be used in the construction of other types of composite members (e.g., fuselage members, empennage members, etc.) in aircraft and other structures. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

We claim:

1. An aircraft structure comprising:
    a first structural member constructed from composite materials, the first structural member having a tapered edge portion, wherein the tapered edge portion has a first surface portion opposite a second surface portion;
    a second structural member having a third surface portion, wherein the tapered edge portion of the first structural member at least approximately abuts the third surface portion of the second structural member;
    a first metallic joining member having a first base portion positioned adjacent to the third surface portion of the second structural member, and a first upstanding leg portion positioned adjacent to the first surface portion of the first structural member, wherein at least a first distal end portion of the first upstanding leg portion is tapered;
    a second metallic joining member having a second base portion positioned adjacent to the third surface portion of the second structural member, and a second upstanding leg portion positioned adjacent to the second surface portion of the first structural member, wherein at least a second distal end portion of the second upstanding leg portion is tapered, and wherein the first base portion of the first metallic joining member is sandwiched between the second base portion of the second metallic joining member and the second structural member;
    a first portion of adhesive forming a first structural bond between the first upstanding leg portion of the first metallic joining member and the first surface portion of the first structural member; and a second portion of adhesive forming a second structural bond between the second upstanding leg portion of the second metallic joining member and the second surface portion of the first structural member.

2. The aircraft structure of claim 1, further comprising:

a third portion of adhesive forming a third structural bond between the first base portion of the first metallic joining member and the third surface portion of the second structural member; and a fourth portion of adhesive forming a fourth structural bond between the second base portion of the second metallic joining member and the first base portion of the first metallic joining member.

3. The aircraft structure of claim 1 wherein the tapered edge portion of the first structural member is bonded to the first upstanding leg portion of the first metallic joining member and the second upstanding leg portion of the second metallic joining member in the absence of any structural fasteners extending through the first and second upstanding leg portions and the tapered edge portion.

4. The aircraft structure of claim 1 wherein the first structural member includes a first core portion sandwiched between a first facesheet and a second facesheet, and wherein the second structural member includes a second core portion sandwiched between a third facesheet and a fourth facesheet.

5. The aircraft structure of claim 1 wherein the tapered edge portion of the first structural member is a first tapered edge portion, wherein the first structural member further includes a second tapered edge portion opposite from the first tapered edge portion, and wherein the second tapered edge portion has a fourth surface portion opposite a fifth surface portion, and wherein the aircraft structure further comprises:

a third structural member having a sixth surface portion, wherein the second tapered edge portion of the first structural member at least approximately abuts the sixth surface portion of the third structural member;

a third metallic joining member having a third base portion positioned adjacent to the sixth surface portion of the third structural member, and a third upstanding leg portion positioned adjacent to the fourth surface portion of the first structural member, wherein at least a third distal end portion of the third upstanding leg portion is tapered;

a fourth metallic joining member having a fourth base portion positioned adjacent to the sixth surface portion of the third structural member, and a fourth upstanding leg portion positioned adjacent to the fifth surface portion of the first structural member, wherein at least a fourth distal end portion of the fourth upstanding leg portion is tapered;

a third portion of adhesive forming a third structural bond between the third upstanding leg portion of the third metallic joining member and the fourth surface portion of the first structural member; and a fourth portion of adhesive forming a fourth structural bond between the fourth upstanding leg portion of the fourth metallic joining member and the fifth surface portion of the first structural member.

6. The aircraft structure of claim 1 wherein the first structural member is a wing rib and the second structural member is a wing spar.

7. The aircraft structure of claim 1 wherein the first structural member is a wing rib and the second structural member is a first wing spar, wherein the tapered edge portion of the wing rib is a first tapered edge portion and the wing rib further includes a second tapered edge portion opposite from the first tapered edge portion, and wherein the second tapered edge portion has a fourth surface portion opposite a fifth surface portion, and wherein the aircraft structure further comprises:

a second wing spar having a sixth surface portion, wherein the second tapered edge portion of the wing rib at least approximately abuts the sixth surface portion of the second wing spar;

a third metallic joining member having a third base portion positioned adjacent to the sixth surface portion of the second wing spar, and a third upstanding leg portion positioned adjacent to the fourth surface portion of the wing rib, wherein at least a third distal end portion of the third upstanding leg portion is tapered;

a fourth metallic joining member having a fourth base portion positioned adjacent to the sixth surface portion of the second wing spar, and a fourth upstanding leg portion positioned adjacent to the fifth surface portion of the wing rib, wherein at least a fourth distal end portion of the fourth upstanding leg portion is tapered;

a third portion of adhesive forming a third structural bond between the third upstanding leg portion of the third metallic joining member and the fourth surface portion of the wing rib; and a fourth portion of adhesive forming a fourth structural bond between the fourth upstanding leg portion of the fourth metallic joining member and the fifth surface portion of the wing rib.

8. An aircraft structure comprising:

a first structural member having a tapered core portion sandwiched between a first facesheet and a second facesheet, wherein the first facesheet has a first surface portion and the second facesheet has an opposite second surface portion, wherein the first and second surface portions meet to form a tapered edge along an outer boundary of the first structural member;

a second structural member having a third surface portion, wherein the tapered edge of the first structural member at least approximately abuts the third surface portion of the second structural member;

a first metallic joining member having a first base portion positioned adjacent to the third surface portion of the second structural member, and a first upstanding leg portion positioned adjacent to the first surface portion of the first structural member, wherein at least a first distal end portion of the first upstanding leg portion is tapered;

a second metallic joining member having a second base portion positioned adjacent to the third surface portion of the second structural member, and a second upstanding leg portion positioned adjacent to the second surface portion of the first structural member, wherein at least a second distal end portion of the second upstanding leg portion is tapered;

wherein the tapered edge of the first structural member is sandwiched between the first upstanding leg portion and the second upstanding leg portion, and wherein the first base portion of the first metallic joining member is sandwiched between the second base portion of the second metallic joining member and the second structural member;

a first portion of adhesive forming a first structural bond between the first upstanding leg portion of the first metallic joining member and the first surface portion of the first structural member; and a second portion of adhesive forming a second structural bond between the second upstanding leg portion of the second metallic joining member and the second surface portion of the first structural member.

* * * * *

UNITED STATES PATENT AND TRADEMARK OFFICE
CERTIFICATE OF CORRECTION

PATENT NO. : 7,575,194 B2  Page 1 of 1
APPLICATION NO. : 11/607333
DATED : August 18, 2009
INVENTOR(S) : Stephen T. Brown et al.

It is certified that error appears in the above-identified patent and that said Letters Patent is hereby corrected as shown below:

On the Title page, Item (57), "Abstract", line 6, delete "angel" and insert -- angle --, therefor.

In column 5, line 63, delete "curing.Types" and insert -- curing. Types --, therefor.

In column 5, line 66, delete "curedadhesives)" and insert -- cured adhesives) --, therefor.

In column 6, line 2, delete "EA9696epoxy" and insert -- EA9696 epoxy --, therefor.

In column 6, line 2, delete "EA9380epoxy" and insert -- EA9380 epoxy --, therefor.

Signed and Sealed this

Twentieth Day of July, 2010

David J. Kappos
*Director of the United States Patent and Trademark Office*